United States Patent [19]

Preis

[11] 4,009,043
[45] Feb. 22, 1977

[54] REINFORCED PLASTICS AND A PROCESS FOR THEIR PRODUCTION

[75] Inventor: Lothar Preis, Cologne, Germany

[73] Assignee: Bayer Aktiengesellschaft, Germany

[22] Filed: Nov. 5, 1975

[21] Appl. No.: 629,105

[30] Foreign Application Priority Data

Nov. 15, 1974 Germany ............ 2454221

[52] U.S. Cl. ............... 106/204; 260/37 N;
260/37 EP; 260/37 SB; 260/38; 260/39 R;
260/40 R; 260/42.17
[51] Int. Cl.$^2$ ............ C08L 1/00
[58] Field of Search ......... 260/42.18, 42.17, 40 R,
260/37 EP, 38, 37 N; 106/288 B, 299, 307,
204

[56] References Cited

UNITED STATES PATENTS 3,607,825  9/1971  Shannon ............ 260/40 R X
3,773,705  11/1973  Wicker ............ 260/42.18 X

FOREIGN PATENTS OR APPLICATIONS 1,110,791  4/1968  United Kingdom ........... 260/40 R

OTHER PUBLICATIONS

Hiratsuka et al.; Chem. Abstracts; vol. 82; 17885h; "Poly(butylene terephthalate) Compositions"; 1975.
Okasaka et al.; Chem. Abstracts; vol. 81; 106740d; "Reinforced Poly(tetramethylene terephthalate) Molding Compositions"; 1974.
Roberts; Chem. Abstracts; vol. 77; 165475m; "Potassium Titanate Fibers Used as Reinforcing Agents"; 1972.
Wambach; Chem. Abstracts; vol. 81; 153630c; "Potassium Titanate Whisker-reinforced Polyester"; 1974.

Primary Examiner—Lewis T. Jacobs
Attorney, Agent, or Firm—Connolly and Hutz

[57] ABSTRACT

Moulding compositions comprising
  60 – 90% by weight of at least one thermoplastic and/or thermosetting polymer,
  5 – 30% by weight of carbon fibres and
  5 – 30% by weight of potassium titanate whiskers ($K_2Ti_6O_{13}$)

result in plastics with extraordinary mechanical properties. Said properties are essentially better than those obtained with equivalent quantities of the individual fibre components on their own.

5 Claims, No Drawings

REINFORCED PLASTICS AND A PROCESS FOR THEIR PRODUCTION

This invention relates to moulding compositions of thermoplastic and thermosetting polymers and mixtures of carbon fibres and potassium titanate whiskers.

It is known that the mechanical properties of plastics materials can be improved by incorporating glass fibres. In this way, it is possible over all to obtain an increase in strength and rigidity and also to improve dimensional stability. The diverse forming possibilities and the economy with which mouldings can be produced from glass-fibre-reinforced plastics materials are particularly advantageous.

By using new high-strength, high-modulus reinforcing fibres which have only recently been developed and which are superior to glass fibres in some respects, it has been possible considerably to broaden the range of application of plastics materials into the field of metallic materials. The carbon fibres obtainable by the pyrolysis of organic fibres, for example polyacrylonitrile fibres, occupy a unique position in this respect.

Carbon fibres are distinguished by particularly high elasticity moduli and strengths combined with low specific gravity and are now available in various grades. They are of particular interest as reinforcing materials for plastics materials and, for this reason, have already been used for applications requiring particularly high-grade mechanical properties, good thermal conduction and low expansion coefficients, for example in air travel and space travel, despite certain disadvantages attributable, for example, to poor fibre/matrix adhesion, processing difficulties and the high price of the fibres. (of. British patent specification No. 1,110,791 and German Offenlegungsschrift No. 1,928,194).

As a rule, the carbon fibres are not sufficiently compatible with the plastics components. This inadequate compatibility results in poor adhesion of the components to one another and is the reason why the outstanding properties of the carbon fibres are not sufficiently developed in the moulding composition.

In general, carbon fibres are processed together with crosslinkable resins which are usually in the form of relatively low viscosity liquids and which provide for effective wetting of the fibres and a limited number of voids in the hardened material. Considerable difficulties are involved in working carbon fibres into thermoplastic plastics materials on account of the high viscosity of these products in the melt.

The reason for this is that the carbon-fibre-reinforced thermoplasts produced by extrusion or injection mouldiing contain only very short fibres which, on account of inadequate wetting, result in only relatively low strengths and moduli in the fibre-reinforced material. Apart from the high price of carbon fibres, this is another reason why carbon-fibre-filled thermoplastic polymers are only of limited practical significance at the present time.

Other highly promising materials for reinforcing plastics are acicular monocrystals, so-called whiskers, of metals, metal oxides, or non-metallic compounds which, by virtue of their extremely good mechanical properties, could be the ideal reinforcing materials for polymeric matrices. All the whiskers which have so far been tested have actually produced the required effects in the material as well. Accordingly, there has been no shortage of attempts over recent years to develop suitable economic processes for the production of whiskers.

However, whereas efforts to find useful ways of producing the simple oxidic whiskers, for example $Al_2O_3-$, $TiO O_2 13$, $ZrO_2-$whiskers, have hitherto been unsuccessful, it has been possible to produce certain potassium titanates in whisker form on an industrial scale.

Potassium titanate whiskers, whose production is described for example in German Offenlegungsschrift No. 2,148,599, are also suitable for use as reinforcing materials for plastic materials. Thermoplasts reinforced with potassium titantate are distinguished, for example, by a high E modulus, high strength and good surface quality, reduced thermal expansion coefficients and, by comparison with glass-fibre-reinforced plastics materials, better flow properties during processing, less machine abrasion and, by virtue of the greater isotropy of the properties, more uniform, but very limited, mould shrinkage.

The influence of the embedded potassium titanate whiskers upon the impact strength and, in particular, the notched impact strength of polymers is not uniform and is governed inter alia by the type of plastics material used and by the quantity of potassium titantate whiskers added. In general, the impact strength of plastics materials reinforced with potassium titantate whiskers, especially with relatively large quantities thereof, is distinctly lower than that of matrices reinforced with glass fibres and carbon fibres.

By virtue of the high luminous relfectance of potassium titanate whiskers, it has been proposed to add this product to glass-fibre-reinforced polymers as a reinforcing white pigment. Unfortunately, it has been found that glass fibres and potassium titanate whiskers are not compatible with one another and that the level of mechanical properties of materials thus produced is below the level of products reinforced with the individual components alone.

Accordingly, it was all the more surprising to find that, by using the mixtures of potassium titanate whiskers and carbon fibres according to the invention, it is possible in many plastics materials to obtain reinforcing effects which are very much superior to the values of polymers reinforced with the individual components.

Accordingly, the present invention relates to moulding compositions based on thermoplastic and thermosetting polymers containing mixtures of potassium titanate whiskers and carbon fibres as reinforcing materials. It is thus possible to utilise the properties of the carbon fibres in a particularly favourable, economic manner.

Matrices suitable for use in the moulding compositions according to the invention are in particular the following plastics materials and plastics intermediates which are preferably process in the melt or from solution: polyolefins, such as polyethylene or polypropylene, styrene polymers and styrene copolymers and graft copolymers, halogen-containing homopolymers and copolymers, polyvinyl acetates, polyacrylates and polymethacrylates, polyolefins and polymers with a mixed chain structure, such as polyoxymethylenes or polyphenylene oxides, cellulose derivatives such as cellulose esters, polyesters such as polycarbonates, polyethylene terephthalates, polyamides, polyimides, polyurethanes, epoxide resins having more than one epoxide group per molecule, unsaturated polyester resins, phenol resins, aminoplasts, silicone resins and cyanate resins.

Polyamides, styrene copolymers, acrylonitrile-styrenebutadiene graft copolymers, saturated and unsaturated polyesters, poly(meth)acrylates and polyepoxides are preferred.

Any standard commercial-grade carbon fibres of the type which may be obtained by the controlled pyrolysis of organic fibres, for example polyacrylonitrile, cellulose or pitch fibres, may be used in accordance with the invention. It is preferred to use the relatively inexpensive carbon fibres with average strength and elasticity molulus values of the kind marketed, for example, in the form of ropes or short fibres. Although not absolutely essential, pretreatment of the carbon fibres to improve their adhesion to the plastics material, for example by oxidising the fibre surface, may have an advantageous effect upon the properties of the moulding compositions according to the invention.

The optimum length of the carbon fibres in the moulding composition is governed by the particular method used for processing and by the type of matrix material used. In any event, the length-to-diameter ratio should not be below 30 : 1 and is preferably higher. In the moulding composition the carbon fibres have preferably an average length of from 200 to 1000$\mu$m and an average fibre diameter of from 6 to 10$\mu$m. The values of the tensile strengths of the starting carbon fibres are preferably in the range of from 150 to 350 kp/mm$^2$ and of the E-moduli of from 18,000 to 40,000 kp/mm$^2$. The average length of the starting carbon fibres is about 2 to 6 mm and the average diameter about 6$\mu$m to 10$\mu$m.

The third component of the moulding compositions according to the invention is potassium titanate whiskers with the chemical composition $K_2Ti_6O_{13}$, an average fibre length of from 5 to 10$\mu$m and an average fibre diameter of from 0.10 to 0.15 $\mu$m. The production of potassium titanate whiskers of this kind is described in German Offenlegungsschriften Nos. 2,148,599 and 2,148,600.

The moulding compositions according to the invention preferably consist of the following components:

Component A: A thermoplastic or thermosetting polymer in a quantity of from 60 to 90% by weight, based on the complete mixture of the three components.
Component B: Carbon fibres in a quantity of from 5 to 30% by weight, based on the total mixture.
Component C: Potassium titanate whiskers in a quantity of from 5 to 30% by weight, based on the total mixture.

Particularly preferred moulding compositions are those which contain from 20 to 30% by weight of components B and C in a ratio by weight of 1 : 2, based on the total mixture of the three components.

The mixtures of the fibre-form reinforcing materials itselves consist of 14 to 86% by weight of carbon fibres and 86 to 14% by weight of potassium titanate whiskers with the chemical composition $K_2Ti_6, O_{13}$.

The moulding composition according to the invention may be obtained in known manner by mixing thermoplast powders or granulates and the two fibre components in kneaders, screw mixers, on mixing rolls or the like, or by impregnating the fibre mixture with the intermediate products of crosslinkable plastics materials. In the case of thermoplastic polymers, it has proved to be particularly suitable to use twin-screw kneading machines which provide for particularly thorough incorporation, leaving the original length of the fibres substantially intact. It is advantageous initially to premix the fibre components, to homogenise the resulting mixture in the melt in an extruder and, finally, to extrude the melt in the form of a strand which may readily be converted into a granulate. Surprisingly, potassium titanate whisker/carbon fibre mixtures are easier to incorporate into thermoplast melts than the individual components on their own.

The moulding compositions of the invention may be processed by the processes normally used for thermoplastic and thermosetting plastics in the usual machines, for example by injection moulding, transfer moulding or compression moulding, to form shaped articles with better mechanical properties than can be obtained with equivalent quantities of the individual fibre components on their own. This synergistic effect is very surprising and could not be predicted.

Further advantages of the moulding compositions according to the invention include the favourable flow properties and the excellent surface quality of shaped articles produced from them which, in terms of smoothness and gloss, substantially correspond to shaped articles of non-reinforced polymers.

In addition, the properties of materials produced in accordance with the invention are surprisingly influenced by the properties of the carbon fibres used. The relatively inexpensive commercial-grade carbon fibres of average strength and average E-modulus (tensile strength: approx. 250 kp/mm$^2$, E-modulus approx. 20,000 kp/mm$^2$) provide the material with better mechanical properties than the much more expensive high-strength commercially available types (with a tensile strength of the order of 290 kp/mm$^2$ and an E-modulus of approx. 25,000 kp/mm$^2$). This is of particular significance because the economy of the claimed materials is additionally favourably influenced in this way.

Another advantage of the invention is the impact strength of the above-defined moulding compositions which, in most cases, is higher than that of comparable materials which are only reinforced with equivalent quantities of one of the components. In addition to this, the mouldings show improved dimensional stability and low thermal expansion coefficients.

The moulding compositions according to the invention are suitable for the production of shaped articles required to show high strength and rigidity, excellent dimensional stability and surface quality and a high resistance to impact-type stressing. Typical examples of application are housings for optical or electrical apparatus, gearwheels, spools, machine components, tubes, profiles and the like.

The invention is illustrated by the following Examples of moulding compositions according to the invention. All percentages are by weight unless otherwise indicated.

EXAMPLES

The starting materials characterised below were used for Examples 1 to 16:
1. Polymers
   1.2. The plastics material referred to as polyamide 6 in the Examples is a polymer of $\epsilon$-caprolactam with a relative viscosity of 2.8, as measured on a 1% solution in m-cresol at 25° C
   1.2. The plastics material referred to as ABS in the Examples in an acrylonitrile-butandiene-styrene graft copolymer produced by emulsion polymerisation. The copolymer consists of two phases, namely a rubber phase of a polybutadiene grafted with styrene-acrylonitrile copolymer, and a resin phase of a styrene-acrylonitrile copolymer. The acrylonitrile copolymer. The acrylonitrile: butandene:styrene ratio amounts to 25:15:60, whilst the styrene:arylonitrile ratio amounts to 72:28.

1.3. The plastics material referred to as polybutylene terephthalate in the Examples is a polycondensation product of terephthalic acid and 1,4-butane diol with a relative viscosity of 1.9, as measured on a 0.5% solution in phenol/tetrachloroethane (1:1) at 25° C 1.4. The epoxide resin used in the Examples was obtained by known methods from bisphenol A and epichlorhydrin and is characterised by an epoxide equivalent weight of approximately 200.

1.5. Finally, an unsaturated polyester resin based on 24 to 28% of maleic acid anhydride, 5 to 7% of benzyl alcohol and 70 to 75% of bis-oxethyl bisphenol A, which is dissolved in styrene and stabilised with 0.02% of hydroquinone, was used as the matrix material for the moulding compositions according to the invention.

2. Carbon fibres

The carbon fibres used, referred to in the Examples as types II and III, were produced by the pyrolysis of polyacrylonitrile fibres and may be characterised by the following data:

| Type II: | elasticity molulus approx. | 25,000 kp/mm$^2$ |
| | tensile strength approx. | 290 kp/mm$^2$ |
| | fibre length | 3 mm |
| | fibre diameter approx. | 8 $\mu$m |
| Type III: | elasticity modulus approx. | 20,000 kp/mm$^2$ |
| | tensile strength approx. | 250 kp/mm$^2$ |
| | fibre length | 3 mm |
| | fibre diameter approx. | 8 $\mu$m |

3. Potassium titanate whiskers

The potassium titanate whiskers used were obtained by the process described in German Offenlegungsschrift No. 2,148,599, and may be characterised by the following data:

| chemical composition | $K_2Ti_6O_{13}$ |
| fibre length | 5 – 10 $\mu$m |
| fibre diameter | 0.10 – 0.15 $\mu$m |

EXAMPLE 1

4200 g of the polyamide-6 were premixed on a roll stand with a mixture of 600 g of carbon fibres, type III, and 1200 g of potassium titanate whiskers, homogenised twice in the melt in a single-shaft extruder (feed zone 230° C, barrel temperature 255° C, nozzle termperature 250° C), granulated and, finally, processed in an injection moulding machine (melt temperature 280° C, mould temperature 40° C) to form test specimens whose mechanical properties were determined immediately after injection moulding:

| flexural strength | (DIN 53 452): | 1820 kp/cm$^2$ |
| E-modulus | (DIN 53 457): | 74500 kp/cm$^2$ |
| (from bending test) | | |
| impact strength | (DIN 53 453): | 31 kpcm/cm$^2$ |

The mechanical properties of test specimens produced in the same way as in Example 1 from non-reinforced polyamide-6 were measured for comparison, the results being as follows:

| flexural strength | (DIN 53 452): | 725 kp/cm$^2$ |
| E-modulus | (DIN 53 457): | 13900 kp/cm$^2$ |
| (from bending test) | | |
| impact strength | (DIN 53 453): | unbroken |

EXAMPLE 2 (Comparison Test)

Test specimens produced as described in Example 1 from the polyamide-6 (5400 g) and carbon fibres, type III (600 g), were found to have the following mechanical properties:

| flexural strength | (DIN 53 452) | 1160 kp/cm$^2$ |
| E-modulus | (DIN 53 457) | 39700 kp/cm$^2$ |
| (from bending test) | | |
| impact strength | (DIN 53 453) | 24.6 kpcm/cm$^2$ |

EXAMPLE 3 (Comparison Test)

Test specimens produced as described in Example 1 from the polyamide-6 (4800 g) and potassium titanate whiskers (1200 g) were found to have the following mechanical properties:

| flexural strength | (DIN 53 452) | 1050 kp/cm$^2$ |
| E-modulus | (DIN 53 457) | 36800 kp/cm$^2$ |
| (from bending test) | | |
| impact strength | (DIN 53 453) | 19.9 kpcm/cm$^2$ |

EXAMPLE 4

Following the procedure of Example 1, 4800 g of the polyamide-6 were homogenised in the melt with a mixture of 600 g of carbon fibres, type III, and 600 g of potassium titanate whiskers, and the melt was injection-moulded into test specimens which, in the specific form, were found to have the following mechanical properties:

| flexural strength | (DIN 53 452) | 1540 kp/cm$^2$ |
| E-modulus | (DIN 53 457) | 52000 kp/cm$^2$ |
| (from bending test) | | |
| impact strength | (DIN 53 453) | 33 kpcm/cm$^2$ |

EXAMPLE 5 (Comparison Test)

Standard test specimens produced from the polyamide-6, which had been reinforced with 10% by weight of potassium titanate whiskers as described in Example 1, were found to have the following mechanical properties:

| flexural strength | (DIN 53 452) | 1080 kp/cm$^2$ |
| E-modulus | (DIN 53 457) | 26700 kp/cm$^2$ |
| (from bending test) | | |
| impact strength | (DIN 53 453) | 49.6 kpcm/cm$^2$ |

EXAMPLE 6 (Comparison Test)

Test specimens produced as described in Example 1 from the polyamide-6 containing 10% by weight of glass fibres as reinforcing material were found to have the following mechanical properties:

| | | |
|---|---|---|
| flexural strength | (DIN 53 452) | 1240 kp/cm² |
| E-modulus (from bending test) | (DIN 53 457) | 30440 kp/cm² |
| impact strength | (DIN 53 453) | 21.6 kpcm/cm² |

EXAMPLE 7 (Comparison Test)

Test specimens produced as described in Example 1 from the polyamide-6 reinforced with 10% by weight of glass fibres and 10% by weight of potassium titanate whiskers were found to have the following mechanical properties:

| | | |
|---|---|---|
| flexural strength | (DIN 53 452) | 990 kp/cm² |
| E-modulus (from bending test) | (DIN 53 457) | 25000 kp/cm² |
| impact strength | (DIN 53 453) | 24.1 kpcm/cm² |

EXAMPLE 8

4200 g of the ABS graft copolymer were premixed on a roll stand with a mixture of 600 g of carbon fibres, type III, and 1200 g of potassium titanate whiskers, homogenised twice in the melt in a single-shaft extruder (feed zone temperature 180°, barrel temperature 190°, nozzle temperature 185°), granulated and finally process in an injection-moulding machine (melt temperature 240° C, mould temperature 40° C) into test specimens which were found to have the following mechanical properties:

| | | |
|---|---|---|
| flexural strength | (DIN 53 452) | 1320 kp/cm² |
| E-modulus (from bending test) | (DIN 53 457) | 86000 kp/cm² |
| impact strength | (DIN 53 453) | 11.2 kpcm/cm² |

Test specimens produced for comparison from non-reinforced ABS graft copolymer in the same way as described in Example 8 were found to have the following mechanical properties:

| | | |
|---|---|---|
| flexural strength | (DIN 53 452) | 790 kp/cm² |
| E-modulus (from bending test) | (DIN 53 457) | 22170 kp/cm² |
| impact strength | (DIN 53 453) | 65.6 kpcm/cm² |

EXAMPLE 9

Test specimens produced as described in Example 1 from the ABS copolymer containing (based on the total mixture) 10% by weight of carbon fibres, type II, and 20% of potassium titanate whiskers as reinforcing material were found to have the following mechanical properties:

| | | |
|---|---|---|
| flexural strength | (DIN 53 452) | 1010 kp/cm² |
| E-modulus (from bending test) | (DIN 53 457) | 62000 kp/cm² |
| impact strength | (DIN 53 457) | 9.5 kpcm/cm² |

EXAMPLE 10

4200 g of the polybutylene terephthalate were premixed on a roll stand with a mixture of 600 g of carbon fibres, type III, and 1200 g of potassium titanate whiskers, homogenised twice in the melt in a single-shaft extruder (feed zone 240°, barrel temperature 250°, nozzle temperature 250°), granulated and finally procesed in an injection-moulding machine (melt temperature 275°, mould temperature 40°) to form test specimens which were found to have the following mechanical properties:

| | | |
|---|---|---|
| flexural strength | (DIN 53 452) | 1450 kp/cm² |
| E-modulus (from bending test) | (DIN 53 457) | 79500 kp/cm² |
| impact strength | (DIN 53 453) | 18.2 kpcm/cm² |

Test specimens produced as described in Example 10 from non-reinforced polybutylene terephthalate were found by way of comparison to have the following mechanical properties:

| | | |
|---|---|---|
| flexural strength | (DIN 53 452) | 948 kp/cm² |
| E-modulus (from bending test) | (DIN 53 457) | 22900 kp/cm² |
| impact strength | (DIN 53 453) | unbroken |

Test specimens produces as described in Example 10 from polybutylene terephthalate containing (based on the total mixture) 10% by weight of carbon fibres, type III were found to have the following mechanical properties:

| | | |
|---|---|---|
| flexural strength | (DIN 53 452) | 1225 kp/cm² |
| E-modulus (from bending test) | (DIN 53 457) | 46250 kp/cm² |
| impact strength | (DIN 53 453) | 21.5 kp/cm² |

Test specimens produced as described in Example 10 from polybutylene terephthalate containing (based on the total mixture) 20% by weight of potassium titanate whiskers were found to have the following mechanical properties:

| | | |
|---|---|---|
| flexural strength | (DIN 53 452) | 1140 kp/cm² |
| E-modulus (from bending test) | (DIN 53 457) | 39500 kp/cm² |
| impact strength | (DIN 53 453) | 16,8 kp/cm² |

EXAMPLE 11

A mixture of
2000 parts by weight of the epoxide resin,
260 parts by weight of 4,4'-diaminodiphenyl methane,
2000 parts by weight of chalk,
100 parts by weight of zinc stearate,
200 parts by weight of carbon fibres, type III, and 400 parts by weight of potassium titanate whiskers was homogenised in a kneader heated to 50° C and then processed by transfer-moulding at 165° C (moulding time approximately 20 minutes) to form test specimens which were found to have the following properties:

| flexural strength | (DIN 53 452) | 5760 kp/cm² |
|---|---|---|
| E-modulus (from bending test) | (DIN 53 457) | 78730 kp/cm² |
| impact strength | (DIN 53 453) | 9.3 kpcm/cm² |

EXAMPLE 12 (Comparison Test)

Test specimens produced as described in Example 11 from a mixture of
  2000 parts by weight of the epoxide resin,
  260 parts by weight of 4,4'-diaminodiphenyl methane,
  2000 parts by weight of chalk,
  100 parts by weight of zinc stearate, and
  200 parts by weight of carbon fibres, Type III
were found to have the following mechanical properties:

| flexural strength | (DIN 53 452) | 4430 kp/cm² |
|---|---|---|
| E-modulus (from bending test) | (DIN 53 457) | 65120 kp/cm² |
| impact strength | (DIN 53 453) | 5.99 kpcm/cm² |

EXAMPLE 13 (Comparison Test)

Test specimens produced as described in Example 11 from a mixture of
  2000 parts by weight of the epoxide resin,
  260 parts by weight of 4,4'-diaminodiphenyl methane,
  2000 parts by weight of chalk,
  100 parts by weight of zinc stearate, and
  400 parts by weight of potassium titanate whiskers
were found to have the following mechanical properties:

| flexural strength | (DIN 53 452) | 3840 kp/cm² |
|---|---|---|
| E-modulus (from bending test) | (DIN 53 457) | 66780 kp/cm² |
| impact strength | (DIN 53 453) | 3.50 kpcm/cm² |

EXAMPLE 14

A mixture of
  2000 parts by weight of the unsaturated polyester resin,
  2000 parts by weight of chalk,
  80 parts by weight of zinc stearate,
  30 parts by weight of magnesium oxide,
  15 parts by weight of tert-butyl perbenzoate,
  300 parts by weight of carbon fibres, type III, and
  600 parts by weight of potassium titanate whiskers
was homogenised in a kneader at room temperature and processed by transfer-moulding at 140° C (moulding time approximately 10 minutes) to fom test specimens which were found to have the following mechanical properties:

| flexural strength | (DIN 53 452) | 5900 kp/cm² |
|---|---|---|
| E-modulus (from bending test) | (DIN 53 457) | 95730 kp/cm² |
| impact strength | (DIN 53 453) | 6.6 kpcm/cm² |

EXAMPLE 15 (Comparison Test)

Test specimens produced as described in Example 14 from a mixture of
  2000 parts by weight of the unsaturated polyester resin
  2000 parts by weight of chalk,
  80 parts by weight of zinc stearate,
  30 parts by weight of magnesium oxide,
  15 parts by weight of tert-butyl perbenzoate, and
  300 parts by weight of carbon fibres, type III
were found to have the following mechanical properties:

| flexural strength | (DIN 53 452) | 4872 kp/cm² |
|---|---|---|
| E-modulus (from bending test) | (DIN 53 457) | 72050 kp/cm² |
| impact strength | (DIN 53 453) | 3.04 kpcm/cm² |

EXAMPLE 16 (Comparison Test)

Test specimens produced as described in Example 14 from a mixture of
  2000 parts by weight of the unsaturated polyester resin,
  2000 parts by weight of chalk,
  80 parts by weight of zinc stearate,
  30 parts by weight of magnesium oxide,
  15 parts by weight of tert-butyl perbenzoate, and
  600 parts by weight of potassium titanate whiskers
were found to have the following mechanical properties:

| flexural strength | (DIN 53 452) | 3701 kp/cm² |
|---|---|---|
| E-modulus (from bending test) | (DIN 53 457) | 53180 kp/cm² |
| impact strength | (DIN 53 453) | 2.13 kpcm/cm² |

I claim:

1. Moulding compositions containing 60 to 90% by weight of a thermoplastic or thermosetting polymer or a mixture thereof, 5 to 30% by weight of carbon fibres with an average fibre length of from 200 to 1,000μm and an average fibre diameter of from 6 to 10 μm and 5 and 30% by weight of potassium titanate whiskers of the formula $$K_2Ti_6O_{13},$$

with an average fibre length of from 5 to 10 μm and an average fibre diameter of from 0.10 to 0.15 μm.

2. Moulding compositions as claimed in claim 1 wherein polyolefins, styrene polymers, graft copolymers, halogen-containing homopolymers or copolymers, polyvinyl acetates, polyacrylates or polymethacrylates, cellulose derivatives, polyesters, polyamides polyurethanes, unsaturated polyester resins, epoxide resins, phenol-, urea-, melamine- or furan-formaldehyde resins, cyanate resins, polyimides or silicone resins, are used as polymers.

3. Moulding compositions as claimed in claim 1, wherein carbon fibres with tensile strengths of from 150 to 350 kp/mm$^2$ and E-moduli of from 18,000 to 40,000 kp/mm$^2$ are used.

4. Moulding compositions as claimed in claim 1, wherein they contain 20 to 30% by weight of a carbon fibre/potassium titanate whisker mixture, based on the complete mixture of the three components.

5. Moulding compositions containing 60 to 90% by weight of a thermoplastic or thermosetting polymer or a mixture thereof, 5 to 30% by weight of carbon fibres with an average fibre length of from 200 to 1,000 μm and an average fibre diameter of from 6 to 10 μm and 5 to 30% by weight of potassium titanate whiskers of the formula $K_2Ti_6O_{13}$, with an average fibre length of from 5 to 10 μm and an average fibre diameter of from 0.10 to 0.15 μm, the carbon fibres and potassium titanate whiskers being in a ratio by weight of 1:2.

* * * * *